United States
Stanberry, Sr. et al

Re. 28,955
ied Sept. 7, 1976

[54] HYDROFOIL VEHICLE

[76] Inventors: William R. Stanberry, Sr.; William R. Stanberry, Jr., both of 1034 N. Kokomo, Derby, Kans. 67037

[22] Filed: July 7, 1975

[21] Appl. No.: 593,363

Related U.S. Patent Documents

Reissue of:

[64] Patent No.: 3,827,391
Issued: Aug. 6, 1974
Appl. No.: 353,903
Filed: Apr. 23, 1973

[52] U.S. Cl. ..... 115/70
[51] Int. Cl.[2] ..... B63H 5/06
[58] Field of Search ..... 115/70; 114/16 F, 66.5 R, 114/66.5 P, 66.5 H, 123, 163; 9/310 A, 310 B, 310 C; 180/3 R, 3 A

[56] References Cited

UNITED STATES PATENTS

| | | | |
|---|---|---|---|
| 234,794 | 11/1880 | Lundborg | 114/163 |
| 2,259,804 | 10/1941 | Davis et al. | 180/3 R |
| 2,817,101 | 12/1957 | Chaffee | 115/70 |
| 2,821,948 | 2/1958 | Harkson | 114/66.5 H |
| 3,096,530 | 7/1963 | Almgren | 9/310 A |
| 3,127,622 | 4/1964 | Drennen, Jr. | 9/310 C |
| 3,284,823 | 11/1966 | Steffel | 9/310 A |
| 3,319,276 | 5/1967 | Penney | 9/310 A |
| 3,570,444 | 3/1971 | Farr | 115/70 |
| 3,726,249 | 4/1973 | Watkins | 115/70 |

*Primary Examiner*—Trygve M. Blix
*Assistant Examiner*—Sherman D. Basinger
*Attorney, Agent, or Firm*—Edward L. Brown, Jr.

[57] ABSTRACT

The hydrofoil vehicle has a buoyant hull to support a rider. A powering device is in the hull with a propeller therefrom. The ski assembly includes a main ski below the hull mounted on the forward and aft ends thereof. It has a pair of helper skis oppositely alongside the aft end portion of the main ski. Stabilizing fins extend below the main ski, and a rudder is used to steer.

4 Claims, 9 Drawing Figures

HYDROFOIL VEHICLE

Matter enclosed in heavy brackets [ ] appears in the original patent but forms no part of this reissue specification; matter printed in italics indicates the additions made by reissue.

Numerous types of recreational water vehicles such as motor skis and hydrofoil vehicles are known to the prior art which are adapted for a person to ride for transportation purposes along surface of water. Generally these water crafts use multiple combinations of skis or flotation bodies to support the craft in the water and to provide a surface on which the craft is moved over or through the water. Some of the prior art water crafts use a pair of skis on the forward portion thereof or a similar device and a large flotation body on the rear thereof with a propeller or an outboard motor extending therethrough. Other prior art water crafts use an elongated ski in two sections, the front section being turnable and the rear section being rigidly attached to the body of the craft. Some prior art devices use a single ski supported below the body of the device, however, this type of water craft has a body in which a person must sit and which has airfoil type lifting devices to aid in lifting the hull from the water. Of the known prior art hydrofoil vehicles some have a cockpit for carrying passengers while others have a padded seat portion on the exterior of the hull for a rider to sit when operating the vehicle. Generally the hydrofoil vehicles known in the prior art using skis have a propeller assembly mounted below the ski or skis thereof for propelling the craft through the water. The propellers for these ski type vehicles are operated by engines mounted within the hull or outboard type motors mounted with the hull or ski supporting structure.

In one preferred specific embodiment, the hydrofoil vehicle includes a buoyant hull to support one or more riders thereon which is above a ski assembly, a powering device mounted in the hull, has a propeller extending below the ski assembly, a steering apparatus has rudders below and above the ski assembly for controlling the hydrofoil vehicle. The ski assembly has a single main ski attached to the hull at the forward and aft end portions thereof; a flotation material with the main ski; a pair of helper skis mounted alongside the aft end portion of the main ski; stabilizing fins mounted below the main ski; and rudders mounted below and above main ski on the forward end portion thereof. The hydrofoil vehicle of this invention is adapted to support and carry one or more riders for recreational use. The hydrofoil vehicle is maneuverable at a low speed and can be accelerated at a high speed at which time the vehicle passes over the water on the main ski and the helper skis. When in motion at a high speed the stabilizing fins and the rudder mounted below the main ski control the vehicle. The hull of the hydrofoil vehicle is a buoyant structure having a streamline shape with a narrowed portion in the center thereof forming a seat for one or more riders and having a widened aft portion with shaped surfaces on the bottom thereof to aid in lifting the vehicle from the water when accelerating to the high speed planing condition. The hydrofoil vehicle hull contains an engine used to operate the propeller which extends below the aft end portion of the main ski. The main ski is provided with flotation material on its forward portion and a hollow portion therealong above the planing surface thereof with the hollow portion adapted to receive water when the main ski is below the surface of the water and discharge same as the main ski moves into the planing condition.

One object of this invention it to provide a hydrofoil vehicle structure overcoming the aforementioned disadvantages of the prior art devices.

Still, another object of this invention is to provide a hydrofoil vehicle having a buoyant hull to support a rider thereon, a ski assembly mounted below the hull attached thereto at the forward and aft end of portions of the hull, the ski assembly having a main ski with a pair of helper skis mounted alongside the aft end portion of the main ski, stabilizing fins mounted below the main ski, rudders mounted below and above the main ski operated by a steering apparatus and with a propeller extending below the aft end portion of the main ski rotated by an engine mounted within the hull.

Still, another object of this invention is to provide a hydrofoil vehicle ski assembly having a main ski and a pair of helper skis:

wherein the pair of helper skis are mounted alongside the aft end portion of the main ski, stabilizing fins are mounted below the main ski and rudders mounted above and below the main ski on the forward end portion thereof.

Still, another object of this invention is to provide a hydrofoil vehicle for recreation and water transportation purposes which has a streamline shaped buoyant hull for one or more riders to sit astraddle thereof, having a ski assembly mounted below the hull and attached thereto and having an inboard engine mounted within the rear portion of the hull to rotate a propeller assembly below the aft end portion of the ski assembly; the ski assembly including a single main ski with a pair of helper skis attached alongside, stabilizing fins mounted below the main ski at the forward end portion thereof and at the aft end portion thereof, having a rudder mounted below the main ski and a rudder mounted above the main ski, having flotation material with the main ski, and further having a hollow portion to receive water when the main ski is submerged and to discharge the water as the main ski moves into a planing condition on the surface of the water.

Various other objects, advantages, and features of the invention will become apparent to those skilled in the art from the following discussion, taken in conjunction with the accompanying drawings, in which:

FIG. 5 is a plan view of the ski assembly taken on line 5—5 of FIG. 1;

Figure 1:
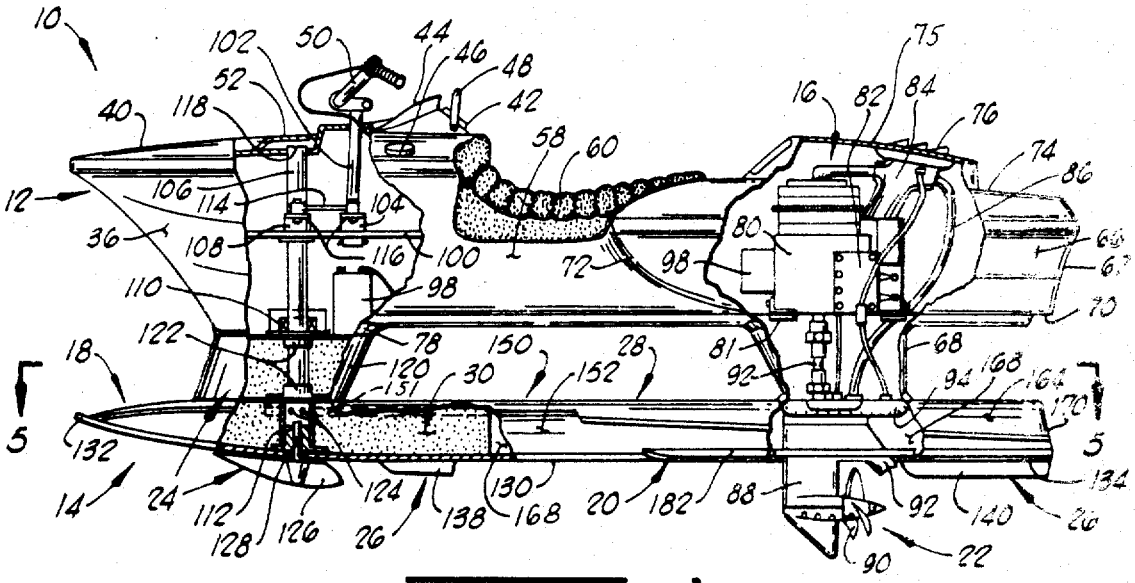
FIG. 1 is a side elevation view of the hydrofoil vehicle having portions thereof cutaway for clarity.

The following is a discussion and description of preferred specific embodiments of hydrofoil vehicle structure of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a hydrofoil vehicle structure of this invention is shown and indicated generally at 10. The hydrofoil vehicle structure 10 includes a buoyant hull, indicated generally at 12, and a ski assembly, generally indicated at 14, mounted below the buoyant hull 12. The buoyant hull 12 provides a narrowed center portion seat area for a rider and encloses the engine, indicated at 16, and mounts the controls for the vehicle. The ski assembly 14 includes a single main ski 18 with a pair of helper skis 20 along each side of the aft end portion thereof, a propeller assembly 22, rudders 24, stabilizing fins 26 on the lower surface of the main ski 18 and a hollow portion 28 having flotation material 30 in the forward end portion therein on top of the main ski.

Figure 3:
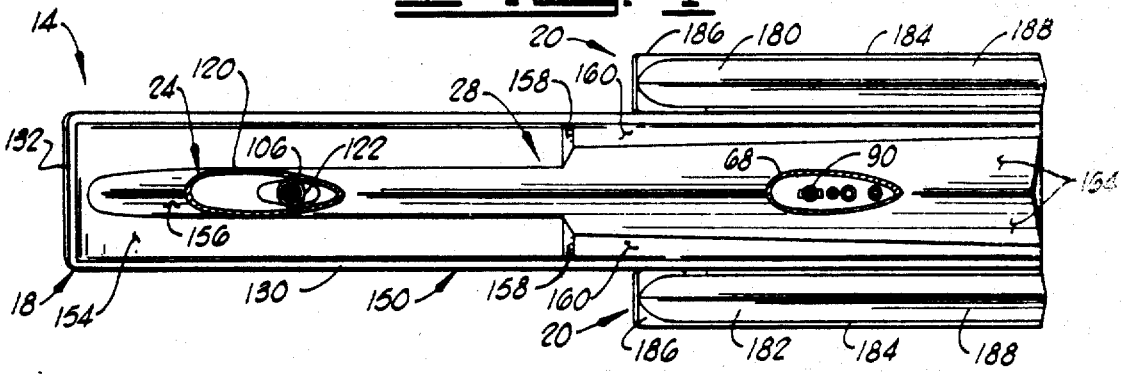
FIG. 3 is a front end elevation view of the hydrofoil vehicle.
Figure 2:
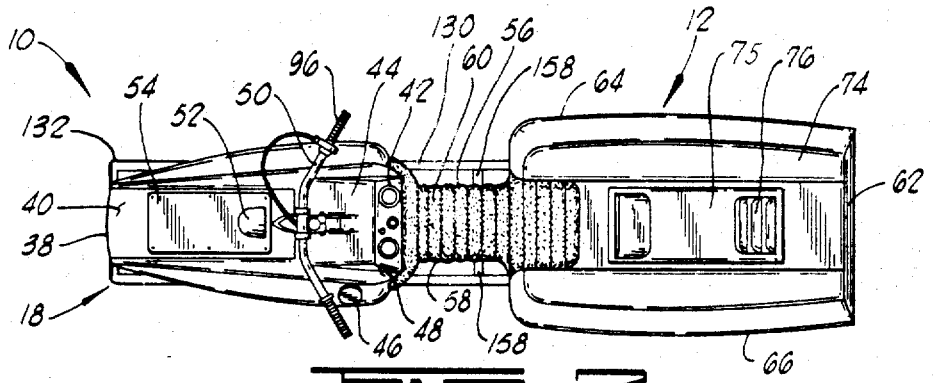
FIG. 2 is a top plan view of the hydrofoil vehicle.
Figure 3:
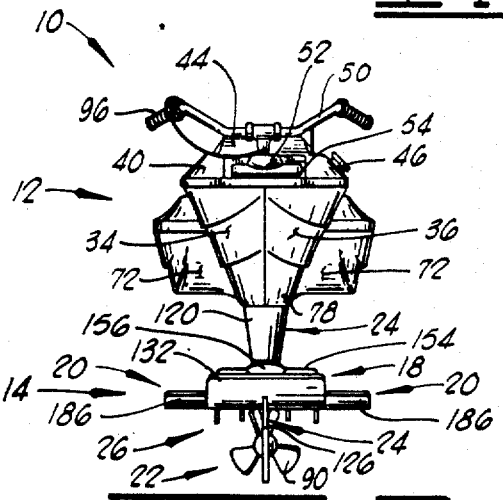

The buoyant hull 12 is shown in detail in FIGS. 1, 2, 3 and 4. The hull 12 is a buoyant structure designed for the purpose of floating the entire vehicle with a rider or multiple riders thereon while motionless in the water, while moving at a relatively slow speed namely slower than planing through the water and supporting them when the vehicle is operating at a relatively high planing speed on the water. The forward portion of the buoyant hull 12 is the bow portion thereof which is constructed in a deep V-shaped and pointed configuration to break the water when moving therethrough at a slow speed with a minimum of resistance. The pointed configuration of the bow portion of the hull 12 is shown in FIGS. 1 and 3 with the starboard side of the bow indicated at 34 and the port side of the bow portion indicated at 36. The upper portion of the bow is wider than the lower portion thereof and has a flattened or blunt shape as shown in FIG. 2 and indicated at 38. A forward deck 40 covers the blow portion of the vehicle and is indicated at 40. The forward deck 40 has therewith the instrument panel 42, the hull ventilation fresh air intake vent 44, the fuel tank filler cap 46, the shifting lever 48 and the handlebars 50. Preferably the fresh air hull vent inlet 44 opens aft at the highest point on the deck 40 to minimize the passage of splashed water thereinto. The fuel tank filler cap 46 is preferably unvented and a fuel tank vent is provided to the atmosphere at another point (not shown in drawing). In the center portion of the deck 40 is the ski assembly air vent which vents air to and from the main ski 18 as will be described in detail hereinafter. A cowl vent or shroud 52 covers the ski assembly air vent and opens aft as shown. The deck 40 has a removable hatch indicated at 54 for access to the interior of the hull 12. The interior of the bow portion is provided with flotation cavities filled with non-sinkable material such as foamic plastic material; the cavities are not shown in the drawings. The center portion of the buoyant hull 12 is substantially narrower than the bow and aft portions thereof. The hull's portions is narrower to enable one or more riders to sit astraddle thereon. The starboard side of the hull center portion is indicated at 56 and the port side at 58. The center portion of the buoyant hull on the upper surface thereof is shaped in the form of an elongated seat and has a pad 60 thereon. The fuel cell or tank for the hydro-foil vehicle 10 is preferably placed in the center portion of the buoyant hull 12 below the seat (not shown in the drawings).

Figure 4:
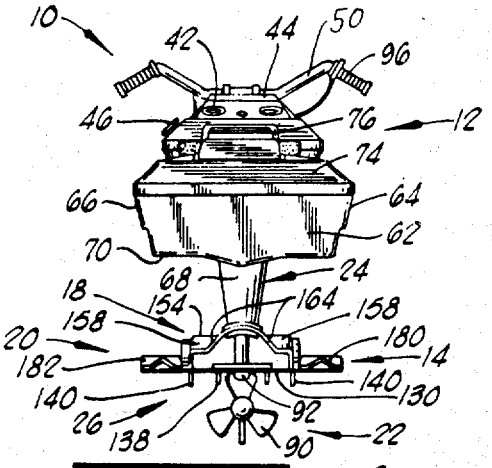
FIG. 4 is a rear end elevation view of the hydrofoil vehicle.

The stern or aft portion of the buoyant hull 12 is substantially wider than the center portion thereof and can be slightly wider than the bow portion, as shown. The increased width of the aft hull portion is necessary to provide extra flotation needed due to the weight of the engine 16 and propeller assembly 22. The rear of the buoyant hull 12 or the sternpost is indicated at 62, the starboard side of the buoyant hull aft end portion indicated at 64 and the port side of the buoyant hull aft end portion indicated at 66. A rear support leg 68 extends downward from the bottom keel portion of the buoyant hull 12 at the aft end portion thereof. The buoyant hull bottom 70 extends outward from the keel portion as shown in FIG. 1, and 4 to the hull sides 64 and 66. Portions of the hull bottom 70 at the forward portion of the buoyant hull's aft portion are indicated at 72 and are curved upward as shown in FIGS. 1 and 3. These surfaces 82 of the bottom 70 are curved to a nearly upright position of the forward portion of the hull's aft portion The particular shape of the hull's aft portion is an important feature of the hydrofoil vehicle in that when the vehicle is moving at a relatively slow speed or when it is accelerating to the planing speed the shape of the buoyant hull bottom surface 70 provides lifting forces which aid in raising the vehicles vertical position in the water. The stern portion of the vehicle and aft deck 74 covers the aft end portion thereof, it has a removable access hatch 75 to provide access to the engine compartment. The louvers or vents indicated at 76 on the engine access hatch 75 provides a hull ventilation exhaust. The engine access hatch 75 is preferably shaped as shown in FIGS. 1, 2 and 4 to allow a clearance around the engine 16. On the keel of the hull at the aft portion thereof the rear mount leg 68 is provided with a flange on the upper end thereof to smoothly join same with the aft end portion of the keel. On the forward portion of the buoyant hull keel a tapered portion indicated at 78 is provided to fair the hull bottom with the rudder leg or upper rudder. This is necessary to provide a streamline structure and allow pivoting of the rudder. The tapered portion 78 is flat on the bottom thereof in the portion which is adjacent to the rudder. The aft portion of the buoyant hull 12 has a cavity portion filled with a non-sinkable flotation material such as foamic plastic material to add strength and to prevent sinking of the vehicle should the hull become filled with water.

Figure 9:
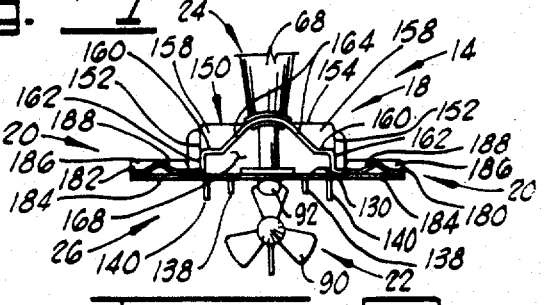
FIG. 9 is a rear elevation view of the ski assembly shown in FIG. 7.

The engine 16 is preferably a water cooled internal combustion engine similar to the types used in out board motors with certain modifications to adapt it to operation with the hydrofoil vehicle 10 of this invention. The engine 16 can be either a rotary or reciprocating internal combustion engine or other suitable rotary power device. The engine 16 shown includes a block portion 80 secured by bolts passing downward through mounts 81, aft end portion of the keel and the upper flange of the rear mount leg 68. The engine 16 has a water cooled exhaust manifold or side plate connected by a conduit or exhaust pipe 86 at the upper end and extends upward therefrom (not shown in drawings) to a loop inside the engine access cover 75 and then downward as shown at 86 to discharge engine exhaust into the lower unit 88. That portion of the exhaust pipe 86 that extends upwards (not shown in drawings) from the upper end of the water cooled exhaust manifold or side plate 82 to form a loop in the engine access cover is air cooled by a flow of air generated by the engine fly wheel and conducted around that portion by the shroud 84. That portion of conduit or exhaust pipe 86 extending downward from the loop to discharge the engine exhaust into the lower unit 88 is cooled by water injected into same in the loop area before the shroud 84 terminates. The propeller assembly 22 includes the lower unit 88 and propeller 90. The lower unit 88 is mounted with the ski assembly 14. It includes a necessary gear drive apparatus to rotate the propeller 90 and an exhaust port 92 to discharge the engine exhaust below the water level. Preferably the lower unit 88 gear drive has forward, neutral and reverse operating capability. The engine 16 is joined by a shaft 92 and universal joints to the lower unit 88. The lower unit 88 is supported at the upper end by a flanged adapter 94 that receives machine screws that pass downward through the flange on the lower end of the rear mount leg 68 and the upper structure 150 of the main ski assembly 18. Lower unit 88 is also attached to ski plate 130 by a flange in the mid portion thereof as shown in FIGS. 1 and 9. A push-pull cable (not shown) connects the gear shift lever 48 with the lower unit 88 for controlling the lower unit between forward, neutral and reverse settings necessary to properly control the vehicle. Another push-pull cable control (not shown) connects a twist grip throttle control 96 on the right-hand end of the handlebars 50 to the engine carburetor, indicated at 98, for controlling the engine 16. The lower unit 88 has therein the water pump used to supply cooling water for the engine 16 and exhaust.

In practice it has been found desirable to mount a bilge pump in the lower end of the rear mount leg 68 for removal of water which collects in this area. A bilge pump is not shown in the drawings. In practice it has been found that water entering the hull 12 will collect in the rear mount leg 68 as it is the lowest point in the hull. A battery, indicated at 98, is mounted in the forward portion of the hull 12 and is used for starting and operating the engine 16. As the hydrofoil vehicle 10 is provided with the battery 98 numerous electrical appliances can be operated on the vehicle such as pumps, navigation lights, electrically operated instruments and other electrical accessories. Forward mounting of the battery 88 has been found advantageous to aid in balancing the vehicle.

The steering assembly connecting the rudders 24 and the handlebars 50 is in the bow portion of the hull 12. The bow portion of the vehicle has a horizontal member 100 through the mid portion thereof for mounting portions of the steering assembly and strengthening the hull structure. The handle bars 50 are attached to an upright member 102 pivotally supported on the upper portion through the deck 40 and on the lower end by a rotatable mount 104 attached to the horizontal member 100. Rotation of the handlebars pivots the upright member 102 in the mount 104. A hollow steering support member 106 connects the hull 12 and the ski assembly 14 and is mounted at a mid portion with the horizontal member 100 by a pivotal mount 108, supported on a lower mid portion by a rotatable bearing-seal mount 110 and further supported on its lower end portion by a mount assembly 112 in the main ski 18. The hollow steering support member is connected by a drag link 114 and steering arms 116 to the upright handlebar member 102 and it is turnable to the right and left by the handlebars 50 to turn the rudders 24. The rotatable mounts 108 and 110 connect the steering support member or the tube 106 to the structure of the hull. The mount 112 is a bearing support and connects the ski assembly 18 to the support member or tube 106. The bearing mount 110 is secured to the keel portion of the hull in the shaped portion indicated at 78. The steering support member 106 is open in its upper end portion 118 which terminates within the vent or shroud 52 in the forward deck 40. The vent or shroud 52 is open on its rear portion to allow air to pass from the atmosphere through the shroud and into the hollow portion of the steering support member 106 for venting the cavity 168. The rudder above the main ski 18 is a low speed rudder 120 and it is preferably shaped in the streamline fashion as shown. The low speed rudder 120 is attached to the steering support tube 106 by brackets 122 to the upper and lower portions of the rudder 120. The low speed rudder 120 turns to the right and left with the steering support member 106 and is adapted to aid in directional control of the vehicle 10 when moving at relatively low speeds, namely speeds at which the ski assembly 14 is submerged normally when the buoyant hull 12 in is contact with the water. The structure of the rubber 120 is preferably smooth on the exterior thereof and is filled with a non-sinkable buoyant material such as foamic plastic material. The rudder 120 pivots to the right and left about a vertical axis in position adjacent to the lower portion of the hull 12 and the upper portion of the main ski 18. The mount 112 within the main ski 18 is adapted to allow the steering support member 106 to rotate relative to the main ski and provides for transmitting forces from the main ski 18 to the steering support member 106 and additionally provides a conduit to pass air and water through the interior of the steering support member 106 to the main ski hollow portion 28 through apertures 124 in the steering mount tube 106 and the foamed portion 30 of the main ski assembly 18. The second rudder 126 is mounted below the bottom surface of the main ski 18; it is a planing rudder effective to control the vehicle when operating in a planing condition. The rudder 126 has the rudder shaft 128 attached to the lower end portion of the steering support member 106. Additionally, the lower mount 112 is adapted to limit rotation of movement to the right and left of the hollow steering support member 106 which in turn limits rotating motion of the rudders 120 and 126 relative to the ski assembly 14. It is to be noted that the ratio of rotation of the rudders 24 relative to the handlebars 50 can be changed or varied by varying the length of the drag link support arms 116 connecting the steering support member 106 with the upright handlebar support member 102, thereby changing their ratio of pivoting. In practice it has been found necessary to limit the rotational motion of the rudders 24 to provide for safe operation of the vehicle throughout its operating speed range. Preferably, the rudder 126 is shaped as shown in FIGS. 1, 3, 6, 7 and 8, such has been found through experimentation in practice to give desirable handling qualities to the hydrofoil vehicle 10. It is understood that rudders having shapes other than the shapes of the specific rudders 120 and 126 can be substituted therefor to function in a similar capacity without departing from the scope of the invention.

Figure 6:
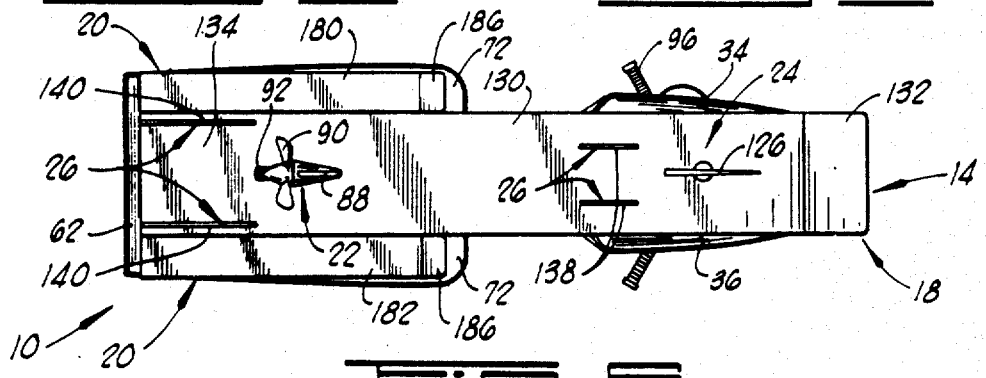
FIG. 6 is a bottom plan view of the hydrofoil vehicle.

The ski assembly 14 is shown in detail in FIGS. 1, 5, 6, 7, 8 and 9. The ski assembly 14 has the main ski 18 thereof preferably extending substantially the length of the hull 12 and the helper skis 20 less than one half of the length of the main ski. The main ski assembly 18 has a ski plate indicated at 130 on the bottom thereof with an upper structure having the hollow portion 28 and the flotation material 30 attached to the top surface of the ski plate 130. The ski plate 130 is generally flat from the center portion to the aft end and smoothly curved upward from the center portion to the forward tip 132 generally as shown. The rear portion 134 of the ski plate 130 along with the helper skis 20 aid optimum angle of attach of hydrofoil vehicle 10 as it is being accelerated to the planing condition. FIG. 5 shows in plan view a preferred structure and shape of the main ski 18, such being substantially rectangular. In practice it has been found that sides 152 of the upper structure 150 should be substantially perpendicular relative to the ski plate 130 as shown to aid stability in leaning turns when the hydrofoil vehicle 10 is operating in the high speed or planing condition. A pair of stabilizing fins indicated at 138 are mounted with the ski plate 130 in a spaced relation aft of the planing or bottom rudder 126. The fins 138 can be parallel in their spaced relation to the rudder 126 as shown in FIG. 6. In practice it has been found that the stabilizing fins 138 provide for a smoother operation of the hydrofoil vehicle when operating in a high speed planing condition by dampening the over effectiveness of the planing rudder 126 and are planing rudder dampening fins. Another pair of stabilizing fins indicated at 140 are mounted with the ski plate 130 on the aft end thereof. The stabilizing fins 140 are mounted on opposite sides of the main ski 18 in a spaced relation as shown in FIG. 6. In practice is has been found advantageous to space the rear stabilizing fins 140 on the outer portions of the main ski 18 for reasons of stability in controlling the vehicle. It is to be understood that the stabilizing fins 26 mounted with the ski plate 130 can be modified or changed in shape, placement and number to change or to maintain the handling characteristics of the hydrofoil vehicle 10. In practice of the hydrofoil vehicle 10 of this invention it has been found that the shown shape and spacing of the stabilizing fins 26 is an arrangement of stabilizing fins which provides for accurately and safely controlling the vehicle.

The preferred shape of the main ski 18 as shown has several definite advantages which provide for governing and controlling operation of the hydrofoil vehicle 10. A concave edge portion of the tip portion of the ski (not visible in the drawings) provides a necessary downward water deflection when the forward speed of the vehicle is reduced thereby allowing the vehicle to let down without undue splashing or spraying to rest on the hull 12. The aft portion 134 of the main ski 18 in combination with the constantly changing curvature from the center to forward end portion 132 of the main ski plate provides a surface which aides optimum angle of attack of the ski 18 relative to the surface of the water when one or more riders induce forward or aft loading and the shape of the ski also aids when leaning turns are made with the vehicle 10. The optimum angle of attach of the ski 18 relative to the water surface has been found to depend upon the speed which the vehicle is moving to some degree but the induced forward or aft loading by one or more riders has little effect.

Figure 7:
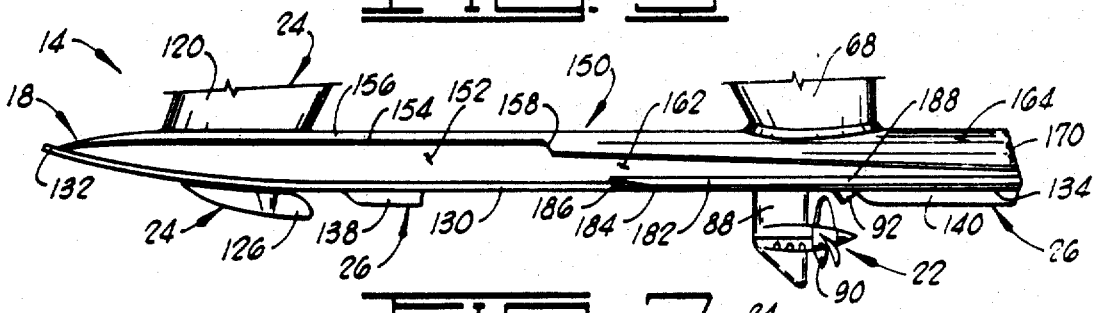
FIG. 7 is a side elevation of the ski assembly shown in FIG. 5.
Figure 8:
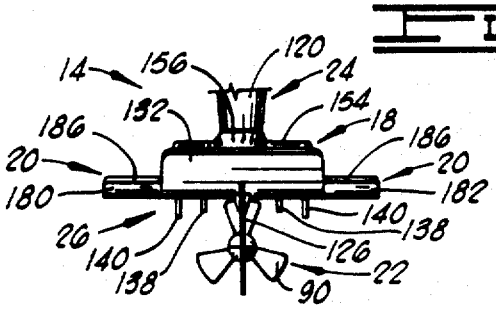
FIG. 8 is a front elevation view of the ski assembly shown in FIG. 7.

The main ski plate 130 has a structure attached thereto comprised of the filled flotation material portion 30 and the hollow portion 28. FIG. 1 shows in detail the main ski 18 with portions cutaway to show the flotation material and the hollow portion. The structure attached to the top of the ski plate 30 is a supporting container like structure, generally indicated at 150, preferably constructed in the shape shown. The upper ski structure 150 is secured to the ski plate 130 along the sides thereof and on the end of the tip portion 132. The ski upper structure 150 provides strengthening or stiffening of the ski plate 130, a container for the flotation material 30 and the upper walls of the hollow portion 28, it also provides a foot rest for a rider. The flotation material 30 is preferably foamic plastic which can be poured and formed in place in the forward portion of the main ski upper structure 150 as shown in FIG. 1. On the forward portion of the ski upper structure 150 it has vertical sides 152 joined by a transversely flat top 154 having a raised hump 156 longitudinally oriented along the main ski 18 as shown. The hump portion 156 extends the length of the main ski 18 with the tp portion thereof being spaced substantially from the ski plate 130 as shown in FIG. 7. The upper structure 150 surfaces 154 and sides 152 decrease in height above ski plate 130 about mid portion thereof. A step portion 158 in the upper structure 150 lowers the top 154 and the height of the sides 152. The top aft of the step portion 158 is indicated at 160 and the sides aft of the step portion 158 are indicated at 162. The sides 162 are tapered to become shorter in height at the aft end of the upper structure. The function of the sides 152 and 162 of the upper structure 150 in operation of the hydrafoil vehicle 10 is to prevent water from passing over the main ski when the vehicle is turned. The surfaces of the sides 152 and 162 contact the water when the vehicle turns while planing to give additional water contact surface area. In practice the sides 152 and 162 increase the vehicles performance and stability while turning.

The hollow portion 28 is formed between the ski plate 130 and the wall of the upper structure 150 aft of the flotation material 30 and has a opening or passage 151 over the flotation material within a hump 156. The hump 156 extends from the mid portion of the main ski to the aft portion thereof at approximately the same height above the ski plate 130 and has the side surfaces thereof indicated at 164 on the aft end portion of the main ski 18. As shown in FIGS. 1 and 9 and indicated at 168, the upper structure 150 is hollow starting at the open aft end indicated at 170 and bounded by the ski plate 130, the upright sides 152 and 162, the hump sides 164, the steps 158, the tops 154 and 160 and the aft end of the flotation material 30. The passage 151 connects the hollow portion or cavity 168 to the apertures 124 in the steering support tube 106 to vent air to and from the hollow portion or cavity 168. When the main ski 18 is being submerged the air in the hollow portion or cavity 168 passes out through passage 151, apertures 124, up through support tube 106 and into the atmosphere to allow the hollow portion 168 to readily fill with water through opening 170. At the starting of the main ski 18 being moved from a submerged condition to a planing condition on top of the water's surface, air passes down through support tube 106, apertures 124, passages 151 and hollow portion or cavity 168 to allow ready jetison of the water in cavity 168 out through opening 170. As water moves from the cavity 168 air will pass from the atmosphere through the cowl vent 52, downward through the hollow steering support member 106, through the apertures 124, through the passageway 151 and into the cavity 168. As the hydrofoil vehicle 10 lets down or changes from the planing condition to a low speed condition wherein the main ski 18 becomes submerged, air within the cavity 168 is replaced by water. When the main ski 18 becomes submerged, air within the cavity 168 can escape by passing through the passageway 151 and apertures 124 in the lower end portion of the steering support mounted 106, passing through the hollow steering support member 106 and into the atmosphere through the cowl vent or shroud 52 on the forward deck 40.

Optimum flotation and upright attitude of the hydrofoil vehicle 10 is accomplished through that amount of flotation material 30 in the front end portion of upper structure 150, flotation material in rudder 120 and water filling the hollow portion or cavity 168 increasing front end buoyancy in this manner allow the flotation hull 12 to have a very streamlined shaped yet be sufficiently buoyant. It is to be noted that the vehicle 10 must be sufficiently buoyant to maintain a substantially horizontal attitude as shown in FIG. 1 when one or more riders sit on it when it is stopped in the water.

The helper skis 20 are shown in detail in FIGS. 5, 6 and 9. The helper skis 20 consist of a pair of skis substantially shorter and narrower than the main ski 18 with one ski each of the pair attached to opposite sides of the main ski 18 at its aft end portion. The helper ski on the starboard side of the hydrofoil vehicle is indicated at 180 and the other helper ski on the port side of the vehicle as indicated at 182. The helper skis 20 are provided with bottom ski plates 184 having upturned generally square shaped tips 186 as shown. A structural reinforcement member 188 is attached to the ski plates 184 and runs the length thereof as shown in FIGS. 5 and 9 to strengthen the helper skis 20. Preferably, the bottom surface of the main ski plate 30 and the bottom surfaces of the helper ski plates 184 lie in substantially the same plane. The helper ski plates 184 and the main ski plate 130 can be constructed integrally or they can be constructed separately and joined to the main ski 18 by welding in the event the ski plates are constructed from metal such as aluminum or they can be joined by adhesive bonding in the event the ski plates are constructed of a plastic material or the ski plates can be joined by any other suitable means. It is to be noted that the helper skis 20 can be warped or turned slightly from the plane of the main ski 18 to be used for trimming the vehicle as needed. In practice it has been found that the helper skis 20 are an important feature of the ski assembly 14 of this invention in that, that added surface area aides the optimum angle of attack when the hydrofoil vehicle 10 is being accelerated to a planing condition and adds to the amount of horizontal surface area of the aft portion of the ski assembly which is necessary to support the weight of the engine 16. Also, the skis 20 provide surface area in addition to that of the main ski for water contact to provide for lateral and rolling stability in the ski assembly when in a planing condition. Additionally, in practice it has been found that the helper skis 20 provide a ski assembly having the required lift to maintain a desirable planing attitude for the hydrofoil vehicle 10 when moving in a high speed or planing condition wherein the ski assembly 14 is on the surface of the water.

The hydrofoil vehicle shown and described herein has been built, and operated by the applicants. In the operaion of the hydrofoil vehicle it has been found that with an engine of approximately 25 horsepower the vehicle will rise to a planing condition at approximately 6 miles per hour and it will obtain a maximum speed of approximately 35 miles per hour.

In the use and operation of the hydrofoil vehicle 10 of this invention, it is seen that same provides a new and unique recreational vehicle for use on water. The hydrofoil vehicle has a hull 12 supported above a ski assembly 14 which will provide transportation for one or more riders sitting on the hull 12. The hydrofoil vehicle 10 is powered by an engine 16 contained within the aft end hull structure. The vehicle 10 is maneuverable at a low speed with the ski assembly 14 submerged. Rudders 24 above and below the main ski 18 provide for controlling the direction of the vehicle. When it is desired to move at a fast speed such as a planing speed, the engine 16 causes the vehicle to be moved through the water at the faster speed so the hull 12 and portions of the ski assembly 18 rise from the water and ultimately to a planing condition with the bottom surface of the main ski 18 and helper skis 20 moving on the surface of the water. As the hydrofoil vehicle 10 moves from the low speed condition to the planing condition water contained within the main ski 18 is replaced by air from the atmosphere as the water exits the main ski through the aft end thereof. When the hydrofoil vehicle is operating in the planing condition, the stabilizing fins 26 on the bottom surface of the main ski 18 provide directional rectional stability and the rudder 126 on the bottom of the main ski 18 provides the needed directional control for the hydrofoil vehicle. The hull 12 of the hydrofoil vehicle 10 is constructed in a streamline shape so as to be attractive in appearance and to be movable through the water with a minimum of resistance when operating in the slow speed condition. Shaped portions on the aft porton of the hull 12 aid in lifting the hull from the water during periods of acceleration. The hull 12 is substantially closed to prevent water from entering the engine compartment in the event that the hydrofoil vehicle is to be turned over or spilled during operation. Additionally, the hull 12 is constructed with non-sinkable portions therein to support the vehicle at the surface of the water should it become filled with water.

In the manufacture of the hydrofoil vehicle of this invention, it is obvious that the vehicle can be produced by methods currently used in the manufacture of boats and water crafts. The hydrofoil vehicle structure can be constructed from materials used in boat construction such as plastic material and fiberglass reinforced polyester resin material, aluminum alloy castings, brass castings and other materials. The hydrofoil vehicle is constructed to use some elements of standard manufacture, such as handlebars instruments, engine and lower unit, and other parts. Preferably, some portions of the vehicle structure are filled with non-sinkable foamic plastic material to provide buoyancy and flotation for safety.

As will become apparent from the foregoing description of the applicant's hydrofoil vehicle, relatively inexpensive, attractive and unique means are provided to give a water recreational vehicle as the end product. The hydrofoil vehicle structure is attractive in appearance, simple to use, operable to carry one or more riders in a rapid fashion on the water in a relatively safe manne. The ski assembly of the hydrofoil vehicle is unique in its single main ski and helper skis mounted below a buoyant hull with rudders and stabilizing fins for controlling the direction of travel of the vehicle and the lower unit propeller assembly at the rear of the ski assembly. The ski assembly is provided with a rudder above and a rudder below the main ski for directional control and a pair of helper skis on the aft portion of the main ski.

While the invention has been described in conjunction with preferred specific embodiments thereof, it will be understood that this description is intended to illustrate and not to limit the scope of the invention which is defined by the following claims.

We claim:

1. A hydrofoil vehicle, comprising:

a. a bouyant hull having means to support a rider thereon, b. a powering means mounted within said hull having a [propeller] *propulsion* means extending therefrom, c. a [main] ski mounted below said hull attached to said hull on the forward end portions and the aft end portions thereof, d. [ a pair of helper skis oppositely mounted with said main ski and longitudinally alongside an aft end portion of said said main ski,]

e. rudder means operatively mounted on said [ main ] ski to steer the same, said rudder means comprises a *first* rudder pivotally mounted above said [main] ski *and relative thereto* and a second *smaller* rudder pivotally mounted below said [ main ] ski *and relative thereto*, said rudders mounted on said forward end portion of said [ main ] ski and essentially pivot in unison around [ the same ] *their respective* vertical axis, and f. stabilizing fin means mounted on said [ main ] ski and extending [there below,] *therebelow*. [said stabilizing fin means includes a foward fin situated behind and adjacent to said second rudder.]

[ 2. The vehicle of claim, 1 wherein:

a. said main ski has an upturned forward portion, b. said pair of helper skis have planar bottom surfaces, upturned tip portions, and extend forward from the aft end of said main ski, and c. said stabilizing fin means additionally includes another fin at an aft end portion of said main ski. ]

[ 3. The vehicle of claim 2, wherein:

a. said stabilizing fin means has a plurality of fins adjacent said second rudder being aft of said second rudder in a spaced relation thereto and parallel to said main ski, b. said stabilizing fin means has a plurality of fins at said aft end portion of said main ski in a spaced parallel relation and being parallel with said main ski, c. said helper skis extend less than one-half the length of said main ski, and d. said helper skis are attached to said main ski along adjacent edges thereof. ]

4. The vehicle of claim [3] 7, wherein:

a. said main ski has a hollow portion extending substantially the length of said main ski open at said aft end of said main ski and vented to the atmosphere at said forward end portion of said main ski, b. said main ski has flotation material attached to the upper forward portion thereof, and c. said powering means has said propeller means extending below said aft end portion of said main ski.

[ 5. The vehicle of claim 4, wherein:

a. said hull has a streamline shape generally pointed in the forward portion thereof, having a generally narrow center portion having a seat thereon for a rider to sit straddling said hull, and having a generally wider aft end portion with the bottom surface of said aft end portion having upwardly turned forward portions, and b. said main ski has a flat bottom surface portion at said aft end portion thereof.]

[ 6. The vehicle of claim 1, wherein said main ski has an upturned forward portion, said helper skis have planar bottom surfaces, upturned tip portions and extend forward from the aft end of said main ski. ]

*7. The vehicle of claim 1, wherein said ski is the main ski; further including a pair of helper skis oppositely mounted with respect to said main ski and longitudinally alongside the aft portion of said main ski.*

*8. The vehicle of claim 1, wherein the first and second rudders are pivoted approximately at their centers about a common vertical axis, the second rudder having a substantially smaller effective area than the first rudder whereby at higher planing speeds the second rudder has a substantially comparable sensitivity to that of the first rudder at lower non-planing speeds.*

* * * * *